Aug. 15, 1961

A. L. BROWNLEE ET AL 2,996,560

CRANKCASE TYPE MAGNETO

Filed Oct. 28, 1958

INVENTOR
ALLEN L. BROWNLEE
GLEN A. GUERNSEY
SIDNEY K. SMART

BY Chapin & Neal

ATTORNEYS

Aug. 15, 1961  A. L. BROWNLEE ET AL  2,996,560
CRANKCASE TYPE MAGNETO
Filed Oct. 28, 1958  2 Sheets-Sheet 2

INVENTOR
ALLEN L. BROWNLEE
GLEN A. GUERNSEY
SIDNEY K. SMART

BY Chapin & Neal

ATTORNEYS

United States Patent Office 2,996,560
Patented Aug. 15, 1961

2,996,560
CRANKCASE TYPE MAGNETO
Allen L. Brownlee, Westfield, Glen A. Guernsey, West Springfield, and Sidney K. Smart, Blandford, Mass., assignors to Globe-Union Inc., Milwaukee, Wis., a corporation of Delaware
Filed Oct. 28, 1958, Ser. No. 770,082
3 Claims. (Cl. 123—149)

The present invention relates to magnetoelectric machines and more particularly to magneto ignition assemblies for internal combustion engines.

In the manufacture of internal combustion engines for hand manipulated machines where size and weight are important considerations, it is desirable that the engines be as light and compact as possible for given horsepower ratings. To this end it is currently a general practice in the design of magneto assemblies to utilize the engine flywheel as a magneto component to provide a unit known as a flywheel magneto. This is often accomplished by mounting a permanent magnet group on the rim of the flywheel and a magneto coil-core group within the flywheel rim. The magnet group thus serves as a portion of the flywheel mass, contributing to its designed inertial characteristics, and is rotatively carried by the flywheel relative to the coil-core for the generation of ignition voltages. Another practice is to mount a magneto, functionally independent of the flywheel, within the rim thereof. While both these types of magneto assemblies result in engines of relatively compact size, they have certain drawbacks particularly when used in conjunction with high speed single cylinder engines not requiring flywheel inertia. Although these types of magneto assemblies may be relatively compact units, there is generally no overall reduction in engine weight achieved by their use and in the case of the flywheel type magneto, counterweights must often be placed in counterbalancing relation to the permanent magnet group carried in the flywheel rim. Furthermore, freedom of design of both flywheels and magnetos is hampered by the utilization of the flywheel type magneto since the flywheel must provide proper engine inertia and in many cases engine cooling while at the same time functioning to produce a proper ignition voltage. For example, it has been found that the mass distribution and diameter of a flywheel cannot be substantially changed without affecting, to some degree, the design of the magneto components associated therewith. In addition, redesign of the magneto components cannot be readily achieved without also requiring changes in the flywheel mass distribution and size. This interrelation of engine and ignition characteristics in the flywheel type magneto is often complicated by the fact that in many cases one company manufactures magnetos while a different company manufactures the engines on which the magnetos are used. Thus, where the engine manufacturer changes the inertial or cooling characteristics of a flywheel, it also involves redesign and retooling for the magneto components. It will, of course, be appreciated that redesign of a magneto as well as a flywheel involves considerable expenditure of time and money whether the engines and magnetos are made by the same or different manufacturers.

It is the primary object of this invention to provide a novel magneto assembly enabling a reduction in overall engine size and weight.

It is another object of this invention to provide a novel magneto assembly which overcomes the drawbacks of flywheel type magnetos without causing an increase in overall engine size and weight.

This invention is based on the concept of utilizing a magneto rotor component as the means for counterbalancing an engine crankshaft. By utilizing a magneto rotor in lieu of a crankshaft counterweight, engines may be manufactured which are generally more compact and lighter in weight than those presently available and in which magneto design is relatively independent of engine cooling and inertial problems.

The above and other objects and advantages of this invention will be more readily apparent from a reading of the following description and with reference to the following drawings.

Figure 1:
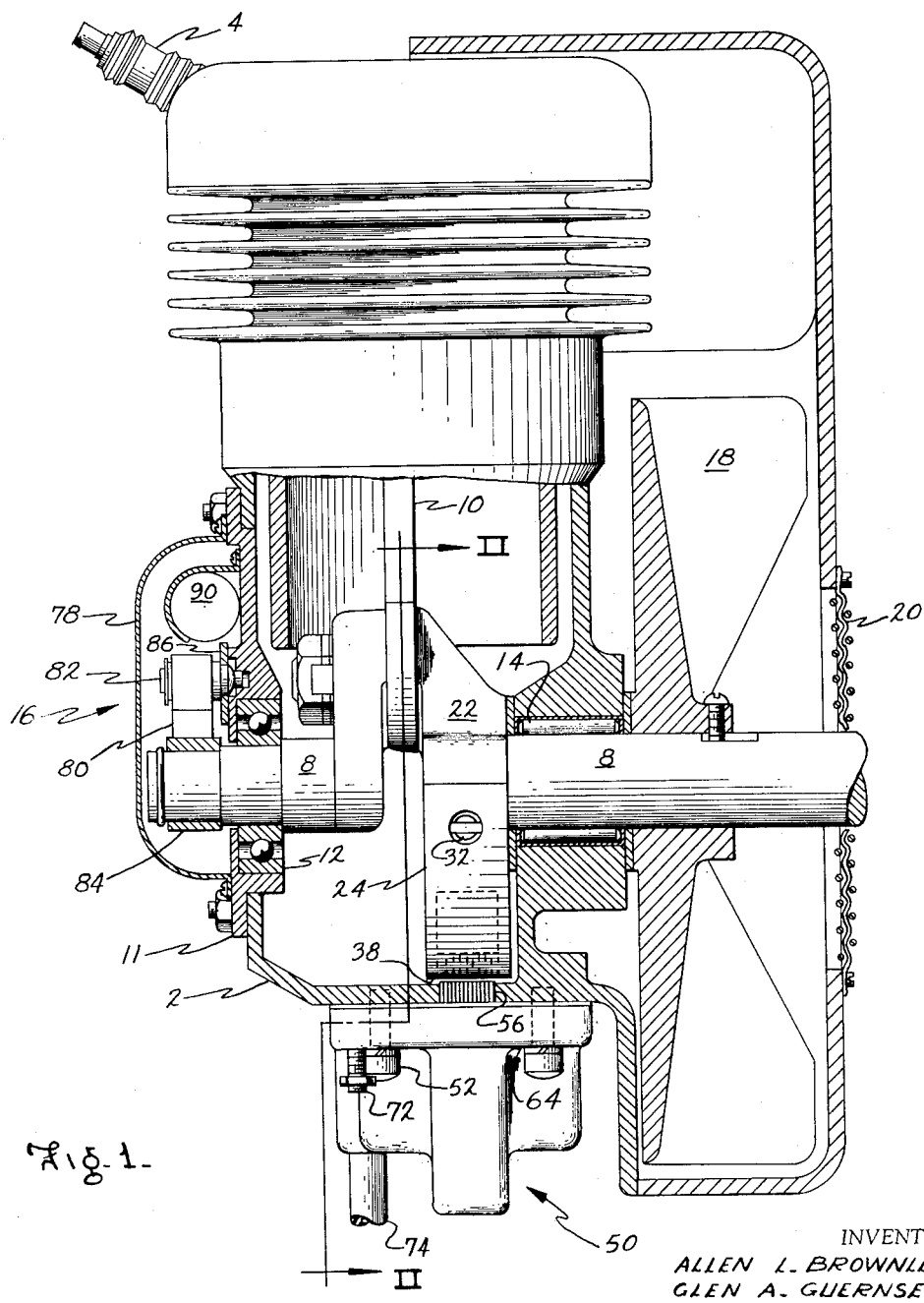
FIG. 1 is a side elevation partly in section of one type of internal combustion engine embodying the present invention.
Figure 2:
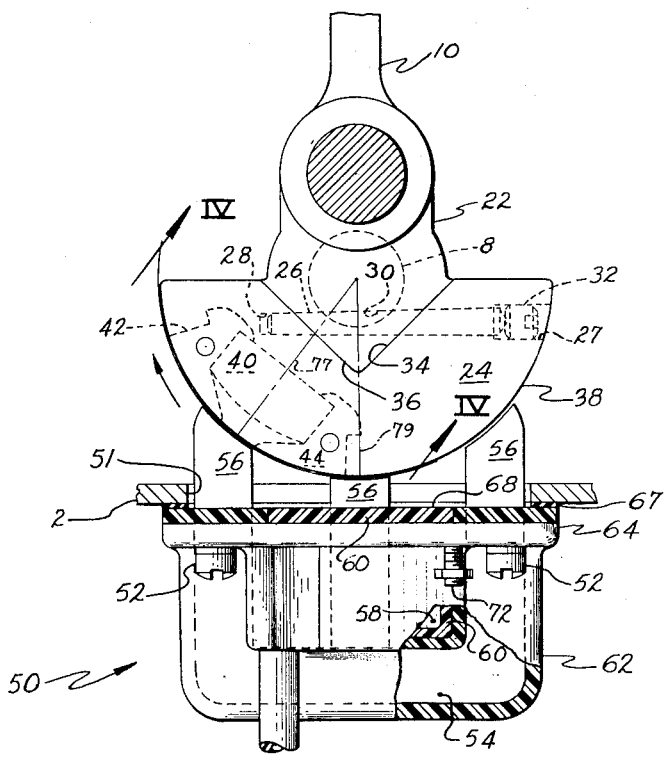
FIG. 2 is a section taken along the line II—II of FIG. 1.

Referring now in detail to the drawings and particularly to FIGS. 1 and 2, the numeral 2 designates the crankcase of a small single cylinder internal combustion engine. A spark plug 4 is disposed in the cylinder head and a piston is connected in driving relation with a crankshaft 8 by means of a connecting rod 10. The crankshaft is journaled at one end in a crankcase cover plate 11 by the bearing 12 and at the other end by the bearing 14. A breaker point mechanism for the engine ignition system is designated generally at 16 and a fan for cooling the cylinder head is indicated at 18. The crankshaft 8 extends outwardly through a protective screen 20 and may be adapted to drive various machines.

The connecting rod 10 is connected to one end of a crank arm 22 of the crankshaft 8 and a member 24 is adapted to be attached to the other end of the crank arm by conventional means. One such attaching means includes a taper pin 26 (FIG. 2) with a set screw 32 for locking the taper pin in position. The pin 26 is tapered to extend through a hole 27 in one side of the member 24 into a hole 28 in the opposite side of the member 24, the center portion of the pin being positioned in a hole 30 disposed through the crank arm 22. The member 24 is designed with sufficient mass and disposed with its center of mass in counterbalancing relation with respect to the crank arm 22 and connecting rod 10. The inner surface of member 24 is recessed as at 34 to conform with the shape of the surface 36 of the crank arm to which it is to be secured. In addition to its function as a counterweight for the shaft 8 the member 24 also serves the dual function of a magneto rotor for the ignition system of an internal combustion engine.

Figures 3, 4:
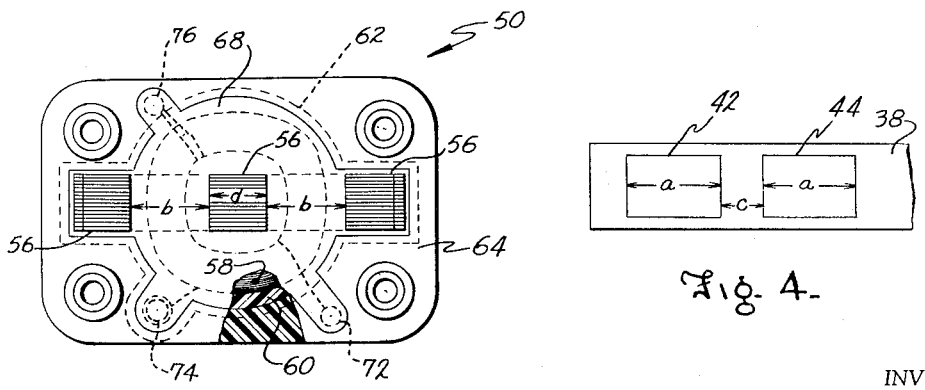
FIG. 3 is a plan view of the magneto stator of the present invention.
FIG. 4 is a section taken along the line IV—IV of FIG. 2.

The rotor and counterweight 24 has a cylindrically curved outer surface 38 coaxial with respect to the axis of the shaft 8. A permanent magnet group is disposed within the member 24 which is preferably die cast of a non-magnetic material such as aluminum or zinc. The permanent magnet group comprises a permanent magnet 40 (FIG. 2) bridging two pole shoes 42 and 44 radially positioned within the body of the member 24 and having pole faces (FIG. 4) of opposite polarity disposed flush with the outer cylindrical surface 38 of the member 24.

A stator member for the magneto assembly is indicated generally at 50 and is shown secured to the crankcase around an opening 51 (FIG. 2) through the crankcase 2 by means of screws 52. The stator comprises a coil-core group including a soft iron core 54 of laminated construction having three parallel leg portions 56 (see also FIG. 3) and an induction coil 58 disposed about the center leg thereof and including primary and secondary windings. The coil-core group is housed within a shell preferably formed of Bakelite and defined by a body portion 62 and a flange 64 extending outwardly from the inner end of the body portion. The coil-core group is embedded in a thermosetting resin 60 preferably of the epoxy type which holds it in place within the body portion of the Bakelite shell and provides an insulation of high dielectric strength for the coil windings. The surface 68 of the epoxy resin forms an inner wall for the stator member to close off, and with a gasket 67, seal the crankcase opening 51. The epoxy resin also seals the coil-core group within the shell 60, protecting the coil from the high temperatures and fuel oil mixture within the crankcase. The inner ends of the core leg portions 56 project beyond the surface 68 of the epoxy resin, through the opening 51 and into the crankcase 2. The inner ends of the leg portions 56 of the core have curved end faces lying in an arc concentric with and slightly spaced from the outer surface 38 of the rotor member 24. The arcuate length $a$ of each of the pole faces of the pole shoes 42 and 44 (FIG. 4) is sufficient to span the distance $b$ (FIG. 3) between the legs 56, and the spacing $c$ (FIG. 4) between the pole faces is less, or at least not greater, than the arcuate length $d$ of the center leg of the core. This dimensional relationship causes a rapid change in the direction of flux through the center leg of the core 54 as the rotor member 24 is carried past the stator member by the rotation of the crankshaft. This rapid change in flux induces a current in the primary winding of the induction coil 58 which may be connected to the breaker point mechanism 16 by a wire leading from the primary terminal 72, which extends outwardly from the flange 64 of the stator. Another terminal 74 is connected to the secondary winding of the coil 58 for connection to the spark plug 4 of the engine. A third terminal 76 is the ground terminal of the induction coil, common to both the primary and secondary windings.

It will be noted that the permanent magnet group as shown in FIG. 2 is disposed about a center line 77 which is angularly offset from the center line 79 of the crank arm 22 in the direction of rotation of the crankshaft 8, clockwise as seen in FIG. 2. The legs 56 of the stator member extend through the hole 51 which is at the bottom of the crankcase and the center leg 56 is aligned with the dead center position of the crank arm center line 79. Thus the angular offset of the magnet group provides ignition sparks in advance of the top dead center position of the crankshaft. The rotor member 24 is adapted to be reversed on the crank arm to a position in which the center line 77 of the magnet group is offset from the center line 79 in a counterclockwise direction and is thus also adaptable for mounting on engines which are run in a direction opposite the engine shown in FIG. 2. Since the ignition timing depends upon the angular position of the crank arm at the instant of flux reversal through the center leg of the core 54, it will be appreciated that spark advance may also be obtained by changing the position in which the stator member is mounted on the crankcase. Thus, for a given engine design the desired spark advance may be obtained by mounting the stator in a position which is offset from the bottom of the crankcase and mounting the magnet group center line in alignment with the crank arm center line.

The breaker point assembly 16 (FIG. 1) is enclosed by a cover 78 which is readily removable to provide access to the assembly for servicing the points. The assembly is of generally conventional construction and includes a breaker arm 80 which is pivotally mounted on a stud 82 for following a cam 84 mounted on the crankshaft 8. The points which are not shown in this figure and the stud 82 are mounted on a bracket 86 which is secured in conventional fashion to the crankcase cover plate 11. The breaker assembly further includes a condenser 90 which is mounted within the cover plate 78. It will be noted that by mounting the magneto in the manner described above rather than within the rim of a flywheel, the breaker point assembly may be mounted at a location which is readily accessible for servicing without the necessity of removing the flywheel from the crankshaft as is generally the case with the flywheel type magneto.

This novel magneto assembly is illustrated in FIG. 1 as being mounted on an engine which is particularly adapted to drive a portable chain saw. However, it is to be understood that this invention is of sufficient scope to be utilized on any type of engine requiring a crankshaft counterweight. The advantages of substituting a magneto rotor for a crankshaft counterweight are numerous since the rotor does not add to the engine size or weight but takes the place of an otherwise necessary engine component within the crankcase. One dramatic illustration of the advantages which accrue from this invention is in connection with the engine illustrated. It has been found that when a high speed engine of this type is connected in driving relation with a chain saw that a flywheel is unnecessary for proper engine performance. The magneto rotor is thus in effect a weightless component dissociated from the engine inertial and cooling problems leaving the engine manufacturer free to take care of these problems as desired. For example, in the illustrated engine, the fan 18 could be radically changed without affecting in any way the magneto design or performance.

Further advantages of this magneto assembly accrue from its utilization in any type of engine requiring a crankshaft counterweight and even where a flywheel is required, since the flywheel size, mass distribution and cooling fin design may be radically changed without necessitating magneto modifications. In this connection, it will be noted that flywheel design is substantially simplified since no consideration must be given to counterbalancing the permanent magnet group as it is adapted to be disposed in counterbalancing relation with the engine crank arm.

What is claimed is:

1. A magneto rotor for internal combustion engines having a crankshaft and a crank arm extending radially outwardly of said crankshaft and disposed within the engine crankcase; said rotor comprising a member of non-magnetic material, a permanent magnet group imbedded in said member, means for attaching said rotor in counter-balancing relation opposite said crank arm, said non-magnetic member and said magnet group having a center of mass disposed on a line extending radially from said crankshaft diametrically opposite the centerline of said crank arm, said magnet group being disposed in said non-magnetic material in a predetermined angular relation to said radially extending line to provide predetermined ignition timing.

2. A magneto rotor for internal combustion engines having a crankshaft and a crank arm extending radially outwardly of said crankshaft and disposed within the engine crankcase; said magneto rotor comprising a member of non-magnetic material, a permanent magnet group imbedded in said member, said non-magnetic member and magnet group having a center of mass disposed on a line extending radially of said crankshaft diametrically opposite the center line of said crank arm, said magnet group being disposed in said non-magnetic member at a predetermined angle measured from said radially extending line in the direction of rotation of said crank arm to provide a predetermined spark advance, and means for reversibly attaching said rotor with its center of mass disposed diametrically opposite the crank arm centerline to provide said predetermined ignition timing for clockwise and counterclockwise running engines.

3. In an internal combustion engine having a crankshaft and a crank arm extending radially of said crankshaft and disposed within the crankcase of said engine; a magnetoelectric machine comprising a rotor member formed of a non-magnetic material, a permanent magnet group imbedded in said non-magnetic material, said non-magnetic material and magnet group having a center of mass disposed on a line extending radially of the crankshaft diametrically opposite the centerline of said crank arm, said magnet group being disposed in said non-magnetic material in a predetermined angular relation to said radially extending line to provide predetermined ignition timing, said crankcase being provided with an opening therethrough, and a stator member including a housing secured to said crankcase about said opening, a core and coil group within said housing, said core and coil within said housing imbedded in a thermosetting plastic, said core having leg portions projecting outwardly of the surface of said plastic and extending through said opening into said crankcase in the plane of rotation of said permanent magnet group providing flux paths for said permanent magnet group, the surface of said plastic serving to close and seal the opening in said crankcase.

References Cited in the file of this patent

UNITED STATES PATENTS

| | | |
|---|---|---|
| 1,291,216 | Smith | Jan. 14, 1919 |
| 2,453,636 | McKay | Nov. 9, 1948 |

FOREIGN PATENTS

| | | |
|---|---|---|
| 499,113 | Italy | Nov. 9, 1954 |
| 778,296 | Great Britain | July 3, 1957 |

OTHER REFERENCES

Magnetic Ignition, published by Briggs & Stratton, received in Div. 28, April 17, 1951, 3 pages.